US006346944B1

(12) United States Patent
Suzuki et al.

(10) Patent No.: US 6,346,944 B1
(45) Date of Patent: Feb. 12, 2002

(54) SIMULATION DISPLAY SYSTEM (75) Inventors: Midori Suzuki; Eiji Ohara; Nobuhiro Suetsugu; Akio Hagino, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/192,270

(22) Filed: Nov. 16, 1998

(30) Foreign Application Priority Data

May 27, 1998 (JP) .......................... 10-145970

(51) Int. Cl.$^7$ .............................. G06T 15/70

(52) U.S. Cl. .................. 345/473; 714/25; 714/26; 714/38; 714/46; 712/227; 717/4

(58) Field of Search ............... 714/25, 26, 38, 714/46; 712/227; 395/704; 345/473

(56) References Cited

U.S. PATENT DOCUMENTS

| 4,821,220 A | | 4/1989 | Duisberg | |
|---|---|---|---|---|
| 5,852,449 A | * | 12/1998 | Esslinger et al. | ........... 345/473 |
| 6,195,591 B1 | * | 2/2001 | Nixon et al. | .................. 700/83 |

FOREIGN PATENT DOCUMENTS

JP 635890 2/1994

OTHER PUBLICATIONS

Gavron et al., How to Use Microsoft Windows NT 4 Workstation, pp.4, 10; 1996.*

* cited by examiner

Primary Examiner—Ulka J. Chauhan
Assistant Examiner—Lance W. Sealey (57) ABSTRACT

A simulation display system includes input deciding means for designating an external signal, a signal which is replaced by an event or an event, and an animation block for displaying the operation of problem to be subjected to simulation by animation on the basis of the signal or the event designated by the input deciding means.

12 Claims, 11 Drawing Sheets

| INPUT | PRESENT REPRODUCTION FRAME NO. | SUCCEEDING REPRODUCTION FRAME NO. |
|---|---|---|
| OFF | 0 | 0 |
| OFF | 1 | 2 |
| OFF | 2 | 3 |
| OFF | 3 | 4 |
| OFF | 4 | 5 |
| OFF | 5 | 6 |
| OFF | 6 | 7 |
| OFF | 7 | 8 |
| OFF | 8 | 9 |
| OFF | 9 | 10 |
| OFF | 10 | 10 |
| ON | 0 | 1 |
| ON | 1 | 1 |
| ON | 2 | 1 |
| ON | 3 | 1 |
| ON | 4 | 1 |
| ON | 5 | 1 |
| ON | 6 | 1 |
| ON | 7 | 1 |
| ON | 8 | 1 |
| ON | 9 | 1 |
| ON | 10 | 1 |

| FRAME NO. | CONTENTS INDICATED BY IMAGE |
|---|---|
| 0 | INPUT IS OFF, TIMER IS INOPERATIVE, OUTPUT IS OFF |
| 1 | INPUT IS ON, TIMER IS INOPERATIVE (CLEAR), OUTPUT IS ON |
| 2 | INPUT IS OFF, TIMER STARTS TO OPERATE, OUTPUT IS ON |
| 3 | INPUT IS OFF, TIMER IS IN OPERATION (1), OUTPUT IS ON |
| 4 | INPUT IS OFF, TIMER IS IN OPERATION (2), OUTPUT IS ON |
| 5 | INPUT IS OFF, TIMER IS IN OPERATION (3), OUTPUT IS ON |
| 6 | INPUT IS OFF, TIMER IS IN OPERATION (4), OUTPUT IS ON |
| 7 | INPUT IS OFF, TIMER IS IN OPERATION (5), OUTPUT IS ON |
| 8 | INPUT IS OFF, TIMER IS IN OPERATION (6), OUTPUT IS ON |
| 9 | INPUT IS OFF, TIMER COMPLETES TO OPERATE, OUTPUT IS ON |
| 10 | INPUT IS OFF, TIMER COMPLETES TO OPERATE, OUTPUT IS ON |

| PRESENT REPRODUCTION FRAME NO. | OUTPUT |
|---|---|
| 0 | OFF |
| 1 | ON |
| 2 | ON |
| 3 | ON |
| 4 | ON |
| 5 | ON |
| 6 | ON |
| 7 | ON |
| 8 | ON |
| 9 | ON |
| 10 | OFF |

FIG. 6

FIG. 7A  INITIAL STATE CALL OFF    FRAME NO.0  OUTPUT IS OFF

FIG. 7B  INPUT IS OFF, PRESENT REPRODUCTION FRAME IS 0
└─ SUCCEEDING REPRODUCTION FRAME IS 0    FRAME NO.0  OUTPUT IS OFF

FIG. 7C  INPUT IS ON, PRESENT REPRODUCTION FRAME IS 0
└─ SUCCEEDING REPRODUCTION FRAME IS 1    FRAME NO.1  OUTPUT IS ON

FIG. 7D  INPUT IS OFF, PRESENT REPRODUCTION FRAME IS 1
└─ SUCCEEDING REPRODUCTION FRAME IS 2    FRAME NO.2  OUTPUT IS ON

FIG. 7E  INPUT IS OFF, PRESENT REPRODUCTION FRAME IS 2
└─ SUCCEEDING REPRODUCTION FRAME IS 3    FRAME NO.3  OUTPUT IS ON

FIG. 7F  INPUT IS OFF, PRESENT REPRODUCTION FRAME IS 3
└─ SUCCEEDING REPRODUCTION FRAME IS 4    FRAME NO.4  OUTPUT IS ON

INPUT IS OFF    FRAME NO.9  OUTPUT IS ON

FIG. 7G  INPUT IS OFF, PRESENT REPRODUCTION FRAME IS 9
└─ SUCCEEDING REPRODUCTION FRAME IS 10     OUTPUT IS OFF

ALL ARE OFF
IN INITIAL STATE

FIG. 10A

INPUT IS OFF   OUTPUT IS OFF

INPUT IS ON

FIG. 10B

INPUT IS ON   OUTPUT IS ON

INPUT IS OFF

FIG. 10C

INPUT IS OFF   OUTPUT IS ON

FIG. 10D

INPUT IS OFF   OUTPUT IS OFF

SIMULATION DISPLAY SYSTEM

BACKGROUND OF THE INVENTION

1. Field of the Invention

The present invention relates to a simulation display system which displays the operation of program by animation. For example, the present invention relates to a simulation display system which is employed under a sequencer programming environment and capable of identifying program errors by expressing the program operation at a program producing stage.

2. Description of the Related Art

Up to now, there has been no technique in which the operation of program is displayed by animation. Conventionally, because the manner in which that respective function blocks operate as a result of programming is not displayed, it is difficult to predict the operation of a program at a pre-execution stage unless the function blocks to be used are sufficiently understood.

SUMMARY OF THE INVENTION

The present invention has been made in order to solve the above-described problem, and therefore an object of the present invention is to provide a simulation display system which expresses the operation of function blocks by animation display to display the partial or entire operation of a program, thereby being capable of a readily predicting the operation of program.

In order to achieve the above object, according to the present invention, there is provided a simulation display system comprising input deciding means for designating an external signal, a signal which is replaced by an event or an event; and an animation block for displaying the operation of problem to be subjected to simulation by animation on the basis of the signal or event designated by the input deciding means.

Also, in the simulation display system according to the present invention, the animation block comprises: input obtaining means for obtaining the signal or the event designated by the input deciding means as an input; reproduction frame data in which a relation of an input, a present reproduction frame and a succeeding reproduction frame is described in advance; reproduction frame deciding means for deciding an animation display frame to be succeedingly displayed with reference to the reproduction frame data on the basis of the input obtained by the input obtaining means and a present animation display frame; animation image data in which a relation of the succeeding reproduction frame and animation image contents is described in advance; display means for displaying a subject animation display frame with reference to the animation image data on the basis of a succeeding reproduction frame decided by the reproduction frame deciding means; output correspondence data in which a relation of the present reproduction frame and an output is described in advance; and output deciding means for deciding a signal or an event as a subject output with reference to the output correspondence data on the basis of the present animation display frame.

Further, according to the present invention, there is provided a simulation display system comprising: input deciding means for designating an external signal, a signal replaced by an event or an event; update control means for sending a display update command to synchronize a plurality of animation displays with each other; a first animation block for displaying the operation of a first function block that constitutes the program to be subjected to simulation by a first animation on the basis of the signal or the event designated by the input deciding means according to the display update command; and a second animation block for displaying the operation of a second function block that constitutes the program to be subjected to simulation by a second animation on the basis of the signal or the event designated by the input deciding means according to the display update command.

According to the present invention, the simulation display system further comprises reproduction control means for sending a reproduction command for starting the reproduction of animation and a stop command for stopping the reproduction of animation, wherein the update control means sends the display update command to all of the animation blocks upon receiving the reproduction command.

Still further, in the simulation display system according to the present invention, each of the first and second animation blocks comprises input obtaining means for obtaining the signal or the event designated by the input deciding means as an input; reproduction frame data in which a relation of an input, a present reproduction frame and a succeeding reproduction frame is described in advance, reproduction frame deciding means for deciding an animation display frame to be succeedingly displayed with reference to the reproduction frame data on the basis of the input obtained by the input obtaining means and a present animation display frame; animation image data in which a relation of the succeeding reproduction frame and animation image contents is described in advance; display means for displaying a subject animation display with reference to the animation image data on the basis of a succeeding reproduction frame decided by the reproduction frame deciding means; output correspondence data in which a relation of the present reproduction frame and an output is described in advance; and output deciding means for deciding a signal or an even as a subject output with reference to the output correspondence data on the basis of the present animation display frame, wherein the input obtaining means of the second animation block obtains an output decided by the output deciding means of the first animation block as an input.

BRIEF DESCRIPTION OF THE DRAWINGS

These and other objects, features and advantages of the present invention will become more fully apparent from the following detailed description taken along with the accompanying drawings in which.

DETAILED DESCRIPTION OF THE PREFERRED EMBODIMENTS

Preferred embodiment of the present invention will be described in more detail with reference to the accompanying drawings.

(First Embodiment)

Figure 1:
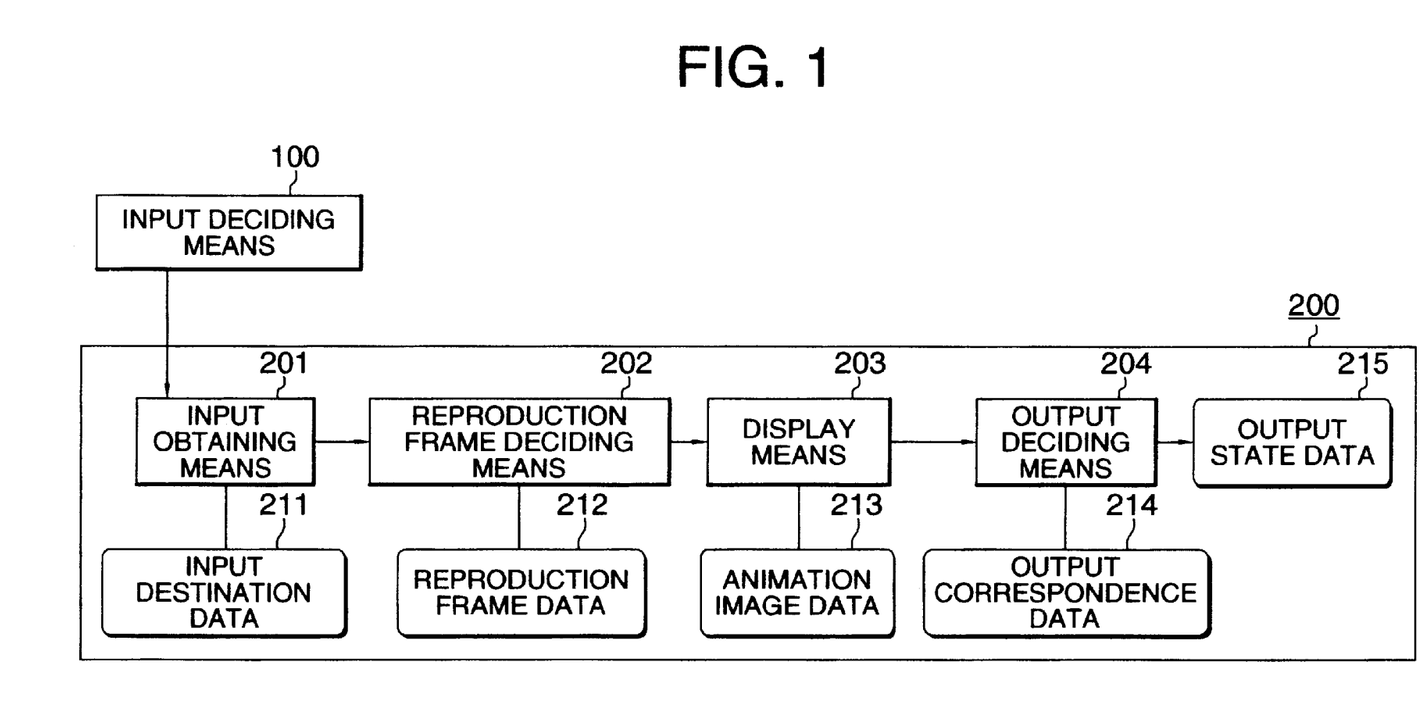
FIG. 1 is a block diagram showing the structure of a simulation display system in accordance with a first embodiment of the present invention.

A simulation display system in accordance with the first embodiment of the present invention will be described with reference to FIGS. 1 to 7G. FIG. 1 is a block diagram showing the structure of a simulation display system in accordance with the first embodiment of the present invention. In the respective figures, identical reference numeral denote the same or like portions.

The simulation display system in accordance with the first embodiment of the present invention includes input deciding means 100 for determining an input state instead of an input to program from an external, and an animation block 200 that expresses the operation of one function block described in the program.

The input deciding means 100 changes the input state according to an input from the user. The animation block 200 includes input obtaining means 201 for obtaining an input; reproduction frame deciding means 202 for deciding which frame should be displayed by the input; display means 203 for displaying a frame; output deciding means 204 for deciding an output of a displayed frame; input destination data 211; reproduction frame data 212; animation image data 213, output correspondence data 214; and output state data 215 for storing an output state.

Figure 2:
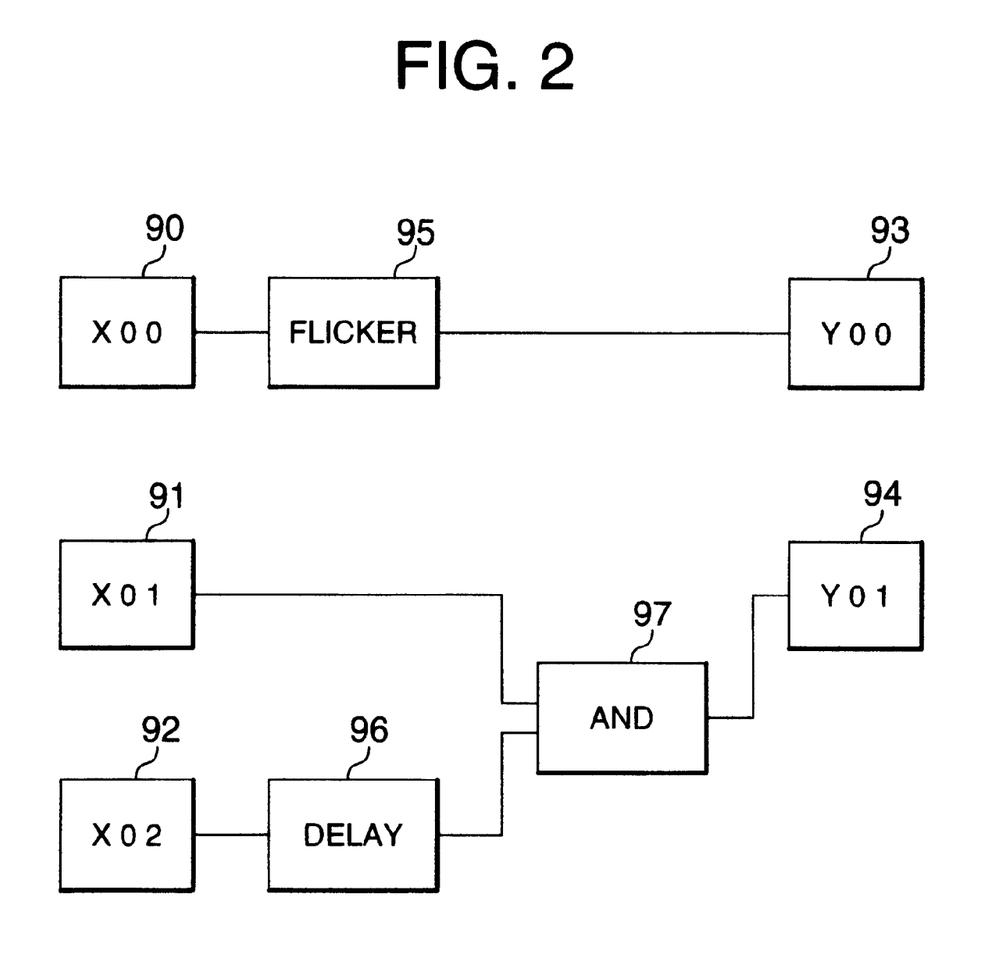
FIG. 2 is a diagram showing program to be subjected to simulation in the simulation display system in accordance with the first embodiment of the present invention.

FIG. 2 shows an example of a program in a programmable logic controller (hereinafter referred to as "PLC") which is to be represented by animation via the simulation display system in accordance with the first embodiment of the present invention.

The PLC is a control unit physically having an input terminal and an output terminal which receives electrical on/off signals from the input terminal to bring the output terminal in the electrical on- or off-state according to the program.

The program is format shown in FIG. 2 is of the program description system in which a function is represented by a block, which is called "function block diagram".

The function has several definitions according to program environments in advance, and in FIG. 2, an input signal is received from the left side, and an output signal is generated from the right side. How the output signal change in relation to the state of the input signal is decided by the kinds of program functions employed.

For example, the function "delay" receives one input signal and keeps an output "on" until a time indicated by a set delay parameter elapses after changing the input signal from on to off. This function is a function that always output the "on" signal when the input signal changes to "on".

In FIG. 2, X00(90), X01(91), and X02(92) denote input terminals, respectively. Also, Y00(93) and Y01(94) denote output terminals of the PLC, respectively. Further, "flicker" (95), "delay" (96) and "and" (97) denote functions, respectively.

The input deciding means 100 is designed to change "on" and "off" of the input signal sent from the external of the function according to the user's input. In the example of FIG. 2, when displaying the "delay" (96) by animation, the "on" and "off" of the input terminal X02 (92) is designated by exchanging "on" and "off" by clicking a region where the input terminal X02 indicated on a screen is expressed by a mouse. This state is obtained by the input obtaining means 201.

The input obtaining means 201 obtains an input to the function. The input obtaining means 201 obtains a value from an input destination described in the input destination data 211. The input destination means an input to the function described in the program which is an input terminal state produced by the input deciding means 100. In the example of FIG. 2, "delay" (96) obtains the input terminal state of X02 (92) produced by the input deciding means 100.

The reproduction frame deciding means 202 decides a display image to express an output state according to the input obtained from the input obtaining means 201. That is, the reproduction frame deciding means 202 decides on a succeeding reproduction frame with reference to the reproduction frame data 212 on the basis of the input obtained from the input obtaining means 201 and the present reproduction frame. Reproduction frame data 212 is describes the succeeding reproduction frame according to the combination of the input value and the present reproduction frame value. That is, a different value is described according to the kind of functions.

The display means 203 displays an image of the animation image data 213 designated by the succeeding reproduction frame, and transmits the present reproduction frame to the output deciding means 204. The animation image data 213 is directed to the collection of images to which serial frame Nos. starting from 0 are assigned. In the animation image data 213, there are stored the collection of images that are different depending on the kind of functions.

The output deciding means 204 decides an output indicated by the displayed image. In the output correspondence data 214, there is described an output corresponding to the present reproduction frame transmitted from the display means 203. In the output correspondence data 214, there are described values that are different depending on the kind of functions. The output deciding means 204 calculates an output from the present reproduction frame with reference to the output correspondence data 214, and stores the output in the output state data 215.

Figure 3:
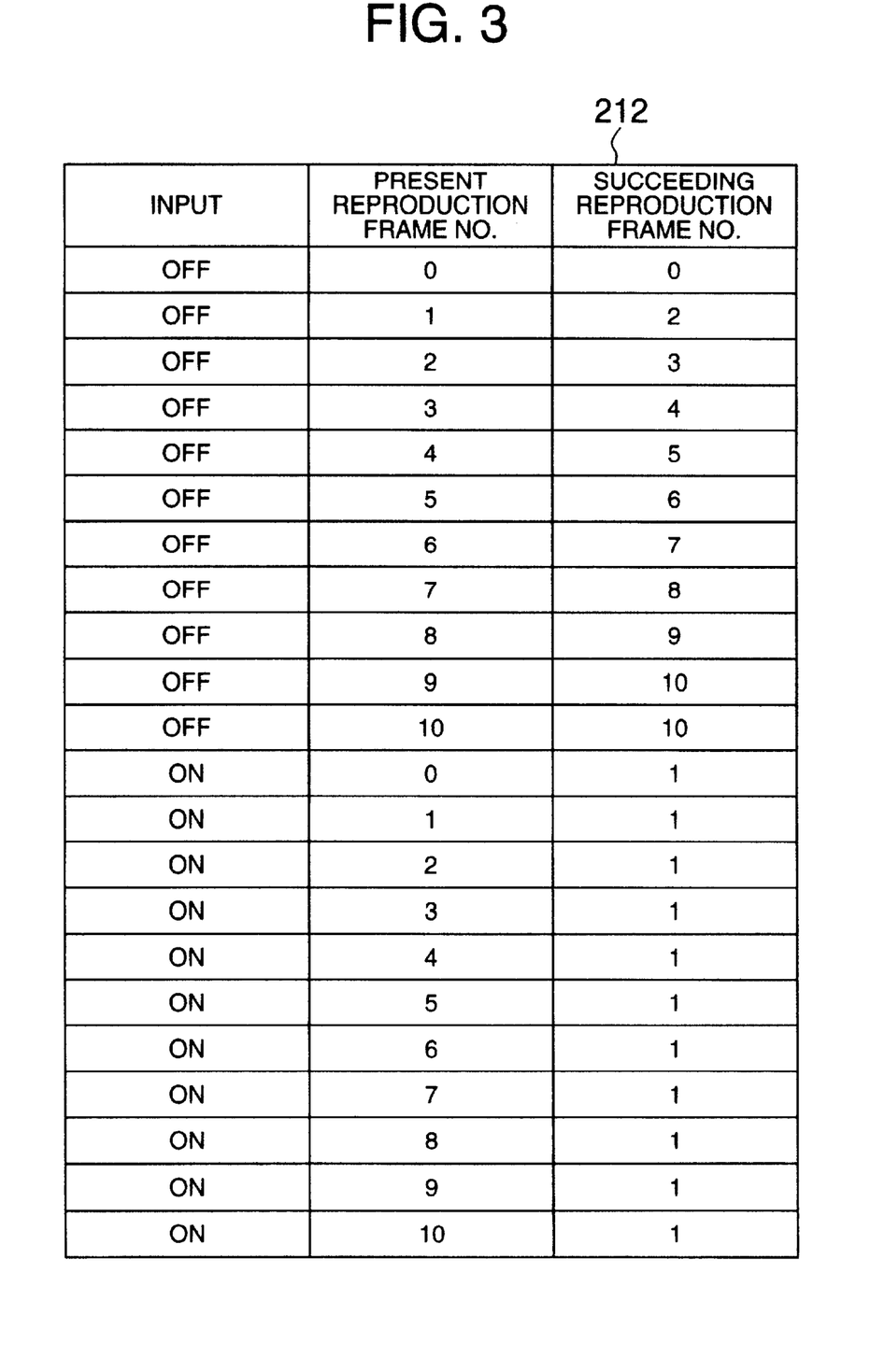
FIG. 3 is a diagram showing the structure of a table of reproduction frame data in a simulation display system in accordance with the first embodiment of the present invention.

FIG. 3 shows an example of the reproduction frame data 212 in the "delay" (96) function. In the reproduction frame data 212, there are described the respective inputs from the input obtaining means 201 and the succeeding reproduction frame Nos. with respect to the respective present reproduction frame Nos. An image representative of an appropriate internal state with respect to a change of the input state in an arbitrary display frame is selected by displaying an image according to the reproduction frame data 212.

Figure 4:
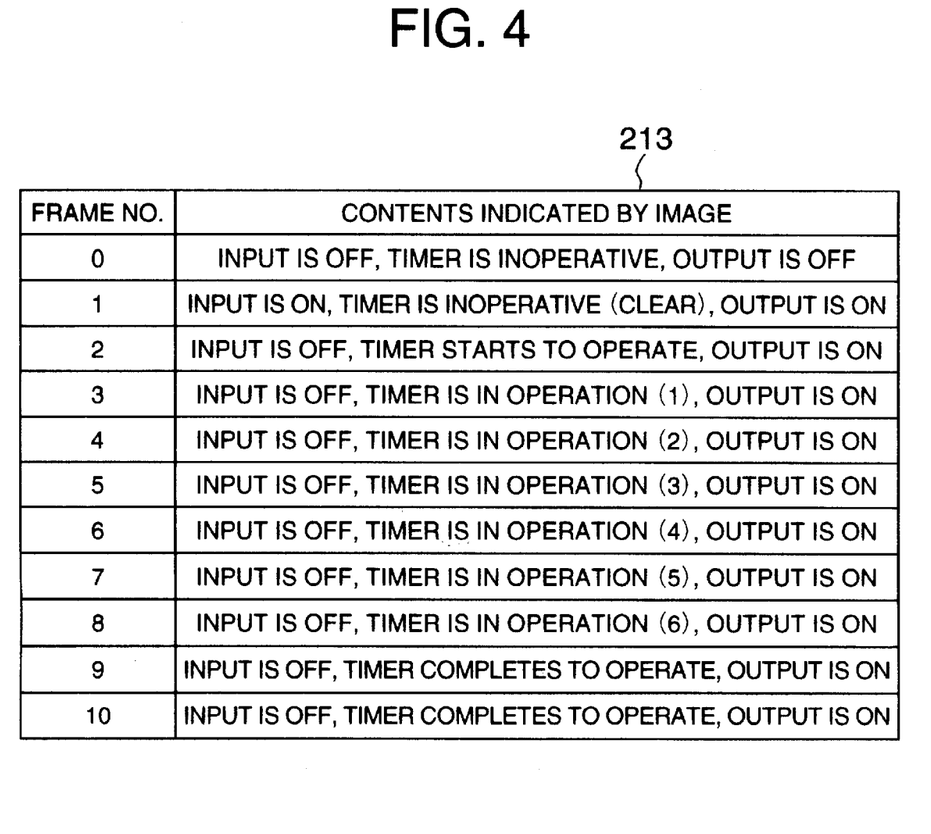
FIG. 4 is a diagram showing the structure of a table of animation image data in a simulation display system in accordance with the first embodiment of the present invention.

FIG. 4 shows an example of the animation image data 213 in the animation block 200 corresponding to the "delay" (96) function.

Figure 5:
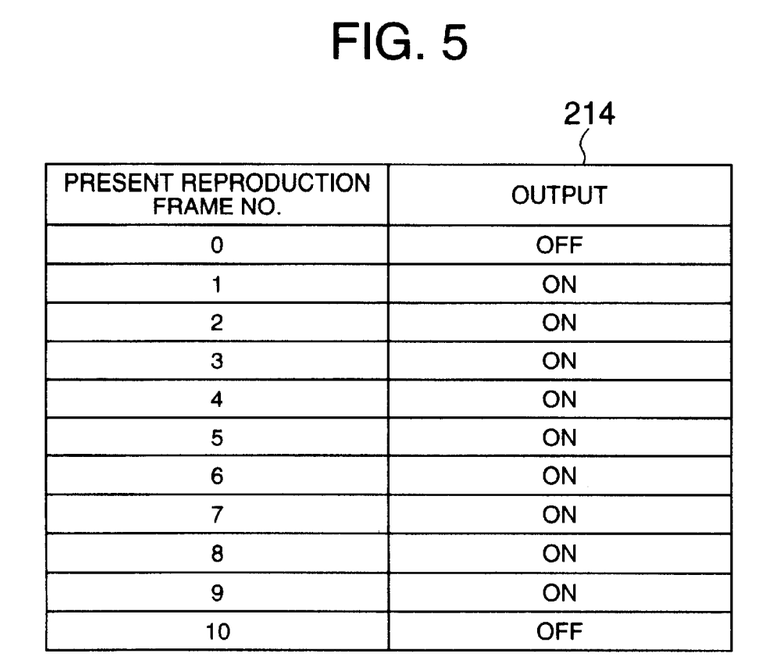
FIG. 5 is a diagram showing the structure of a table of output correspondence data in the simulation display system in accordance with the first embodiment of the present invention.

FIG. 5 shows an example of the output correspondence data 214 in the animation block 200 corresponding to the "delay" (96) function. In the output correspondence data 214, there is described an output state having the contents displayed by the image specified by the frame No.

Figure 6:
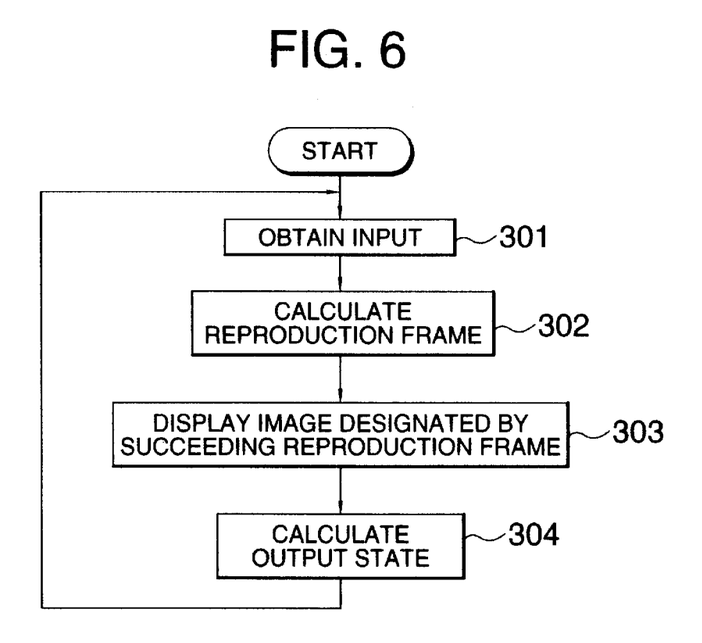
FIG. 6 is a flowchart showing the operation of the simulation display system in accordance with the first embodiment of the present invention.

Then, the operation of the simulation display system in accordance with the above-described first embodiment will be described with reference to the drawings. FIG. 6 is a flowchart showing the operation of the simulation display system according to the first embodiment of the present invention.

In Step 301, the animation block 200 obtains an input signal from an address described in the input designation data 211. Then, in Step 302, a succeeding reproduction frame is obtained from the reproduction frame data 212 on the basis of the input obtained in Step 301 and the present reproduction frame. Thereafter, in Step 303, an image of the animation image data 213 designated by the succeeding reproduction frame is displayed. Then, in Step 304, an output is calculated from the output correspondence data 214 on the basis of the present reproduction frame and then stored in the output state data 215.

Subsequently, the specific operation of FIG. 6 will be described while indicating specific animations shown in FIGS. 7A to 7G using data shown in FIGS. 3 to 5 with an example of the animation of the "delay" (96) function shown in FIG. 2.

Figure 7A:
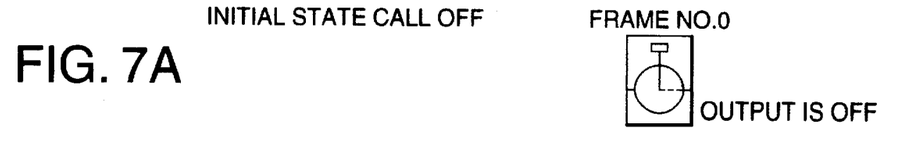
FIGS. 7A to 7G are flowcharts showing examples of animation display in the simulation display system in accordance with the first embodiment of the present invention.

In an initial state, the display frame No. is "0", and all the states are "off". As shown in FIG. 7A, the initial state of a timer is displayed.

In Step 301, it is assumed that the off state of an input be obtained. Then, in Step 302, the succeeding reproduction frame No. is decided to be "0" referring an item where the input of the reproduction frame data 212 is "off" and the present reproduction frame No. is "0" in FIG. 3.

Figure 7B:
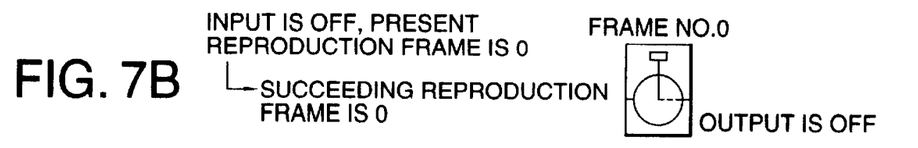

Then, in Step 303, because the succeeding reproduction frame is "0", an image representing that the input is off, the timer is inoperative and the output an off is displayed as shown in FIG. 7B. Then, in step 304, because the present reproduction frame is "0", the output is decided to be "off".

Subsequently, returning to Step 301, it is assumed that the on-state of the input is obtained. Then, in Step 302, the succeeding reproduction frame No. is decided to "1" to be "1" by referring an item where the input of the reproduction frame data 212 is "on" and the present reproduction frame No. is "0" in FIG. 3.

Figure 7C:
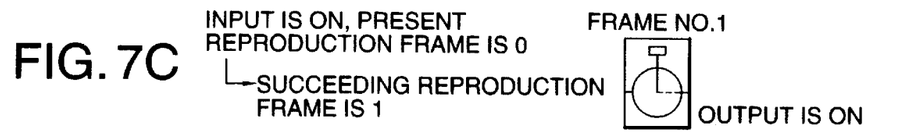
Figure 7D:
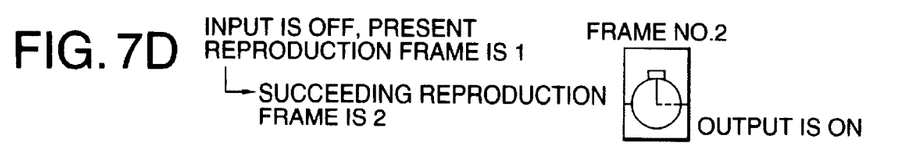
Figure 7E:
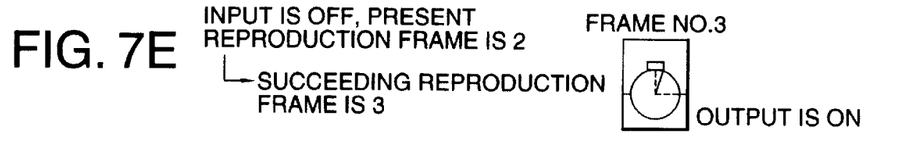
Figure 7F:
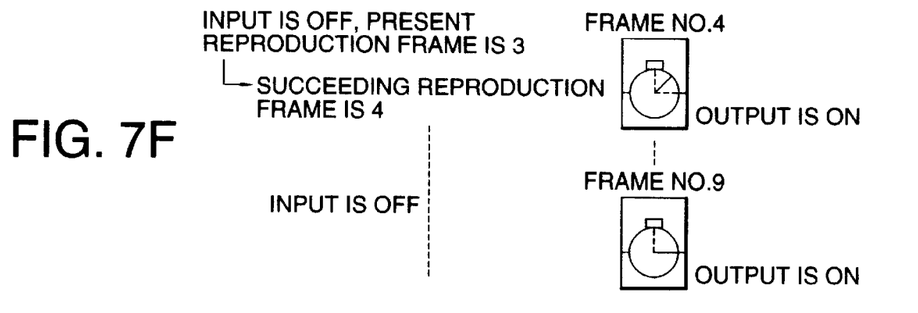

Then, in Step 303, because the succeeding reproduction frame is "1", an image representing that the input is on, the timer is inoperative (clear) and the output is on is displayed as shown in FIG. 7C. Then, in step 304, because the present reproduction frame is "1", the output is decided be "on".

Figure 7G:
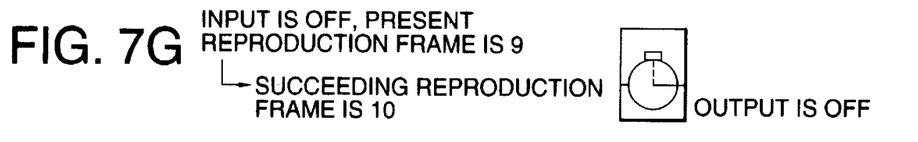

Further, the operation of returning to step 301 is repeated. The display is shown in FIGS. 7D to 7G. FIG. 7G shows an appearance in which the output becomes "off" after a predetermined period of time elapses (is delayed) since the input becomes "off".

In this way, the proceeding is repeated so that a frame to be displayed is decided from the input and the present reproduction frame No. For example, in the case where the input designated by the user is designated to "off", "on", "off", "off", "off" and "on" in the stated order, the image operates with the expressions that the input is off, the timer is inoperative (clear) and the output is off, that the input is on, the timer is inoperative (clear) and the output is on, that the input is off, the timer starts to operate and the output is on, that the input is off, the timer is in operation (1) and the output is on, that the input is off, the timer is in operation (2) and the output is on, and that the input is on, the timer is inoperative (clear) and the output is on, in the stated order. Thus, the image can express the operation of "delay" (96) when the input becomes "on" before a period of time designated after the input becomes "off" elapses.

That is, the simulation display system according to the first embodiment of the present invention allows a user to readily confirm the function block that constitutes a program, and assess the operation of the partial or entire program without any execution of a program. An animation representing the operation of the function block in the program is displayed in correspondence with the function block. The operation indicated by the animation image, and an association of the signals or the events of the input and the output are described in the reproduction frame data 212, the animation image data 213 and the output correspondence data 214 in advance, and an appropriated image is selected and displayed with respect to the input in an arbitrary reproduction frame.

(Second Embodiment)

Figure 8:
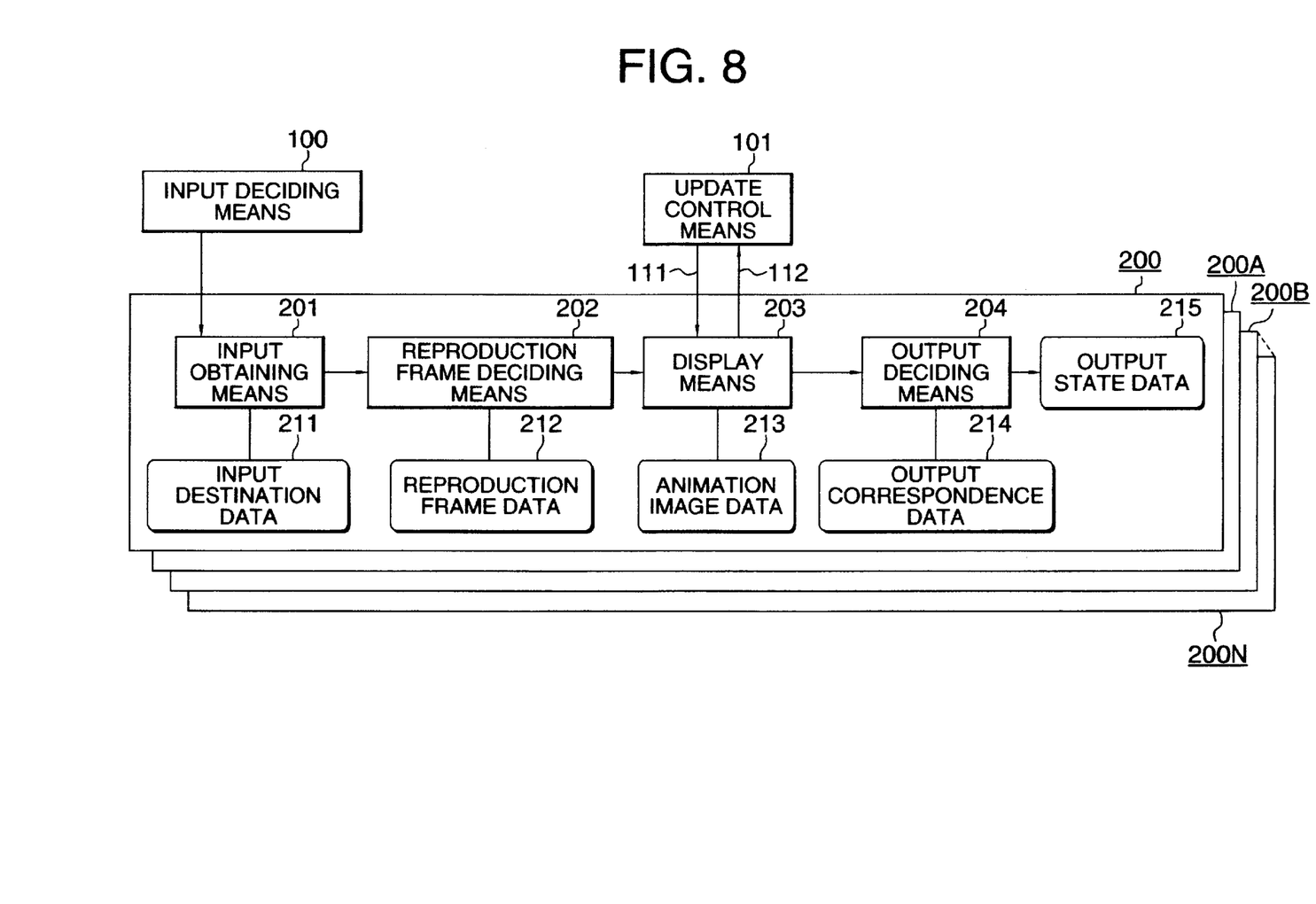
FIG. 8 is a block diagram showing the structure of a simulation display system in accordance with a second embodiment of the present invention.

A simulation display system in accordance with a second embodiment of the present invention will be described with reference to the drawings. FIG. 8 is a block diagram showing the structure of a simulation display system in accordance with the second embodiment of the present invention.

In the above-described first embodiment, the operation of one function block is displayed by animation, whereas in the second embodiment, the entire program having a plurality of function blocks is displayed by a plurality of animations.

In FIG. 8, the same functions as those in the first embodiment are denoted by identical reference numeral and their description will be omitted.

The simulation display system in accordance with the second embodiment of the present invention includes input deciding means 100 for determining an input state instead of an input to a program from an external, a plurality of animation blocks 200, 200A, 200B, . . . 200N, and update control means 101 synchronizing with those display updates.

In the animation blocks 200A, 200B, . . . 200N having the outputs of other functions (function blocks) as inputs, there are described the output state data 215 of the animation blocks 200, 200A, 200B, . . . , which express the functions as inputs in the input destination information.

For example, in the "AND" (97) function of FIG. 2, there are described output state data 215 of the animation block which expresses the "delay" (96) function and data corresponding to the state of "X01" (91) of the input deciding means 100.

The update control means 101 transmits a display update command 111 to the display means 203 of all the animation blocks 200, 200A, 200B, . . . 200N by mouse clicking, and receives an update completion notice 112 from the display means 203. That is, the display update command 111 is sent to the display means 203 to control the update interval of the animation.

Figure 9:
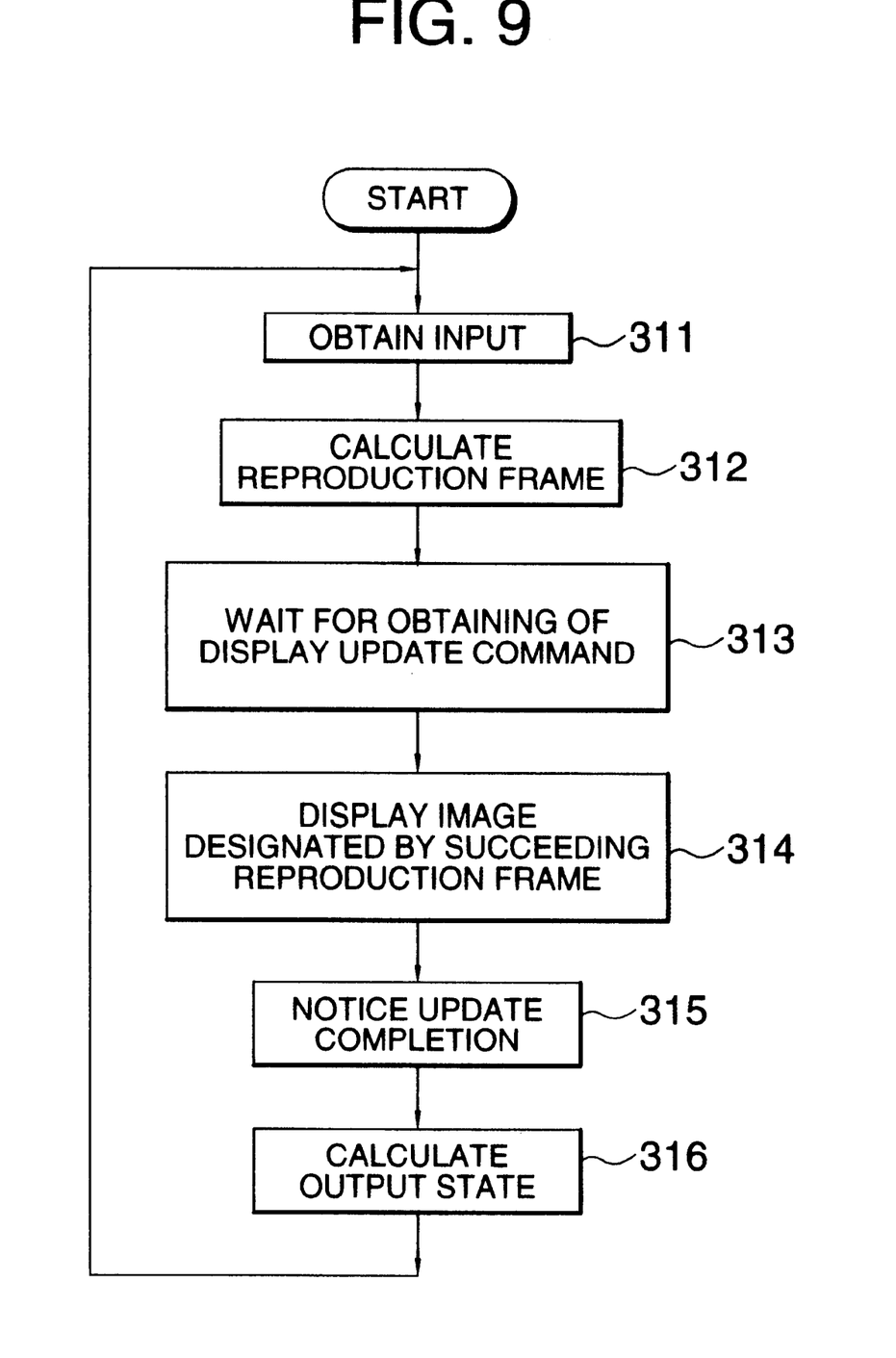
FIG. 9 is a flowchart showing the operation of the simulation display system in accordance with the second embodiment of the present invention.

FIG. 9 is a flowchart showing the operation of the animation block at the time of reproduction. First, in Step 311, an input signal is obtained from the address described in the input designation data 211. Then, in Step 312, a succeeding frame is obtained from the reproduction frame data 212 on the basis of the input obtained by Step 311 and the present reproduction frame No. Thereafter, in Step 313, waiting occurs until the display update command 111 from the update control means 101 arrives. This is because the animation displays for the respective animation blocks are synchronized.

Then, in Step 314, an image of the animation image data 213 designated by the succeeding reproduction frame is displayed. Thereafter, in Step 315, the update completion notice 112 is transmitted to the update control means 101. Then, in Step 316, an output state is calculated from the output correspondence data 214 on the basis of the present reproduction frame, and then stored in the output state data 215.

For example, in FIGS. 10A to 10D, the animation blocks 200, 200A and 200B represent the appearance of the animations of "switch", "timer" and "lamp", respectively.

Figure 10A:
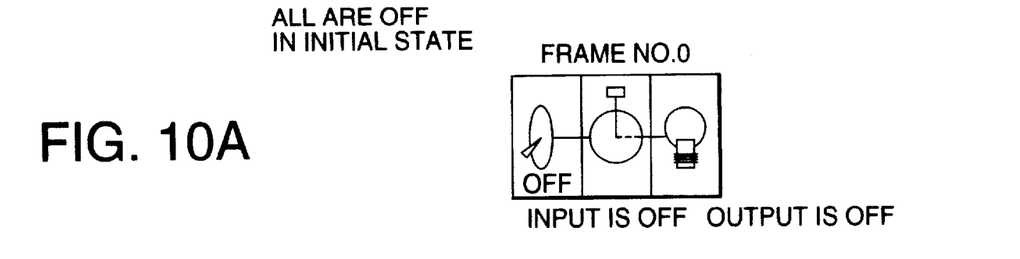
FIGS. 10A to 10D are flowcharts showing examples of animation display in the simulation display system in accordance with the second embodiment of the present invention.
Figure 10B:
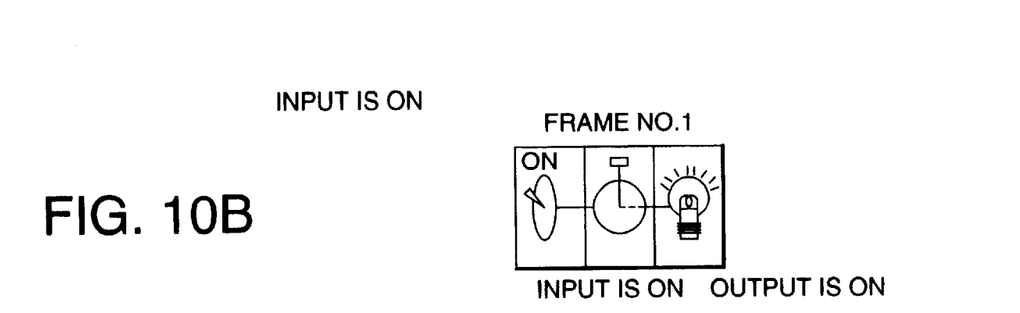
Figure 10C:
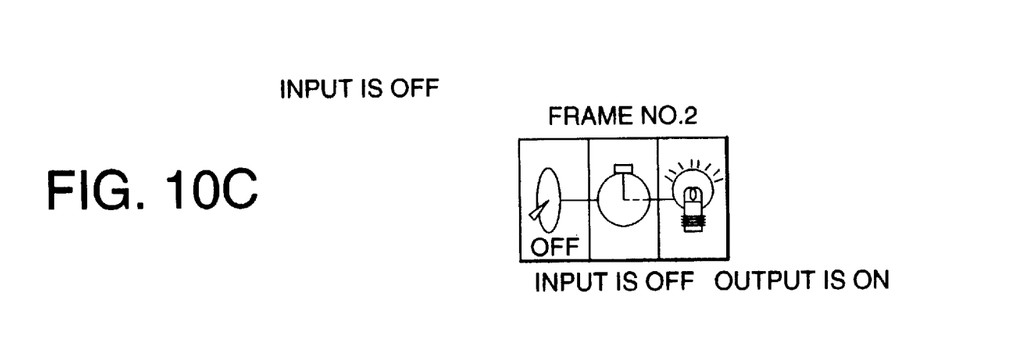
Figure 10D:
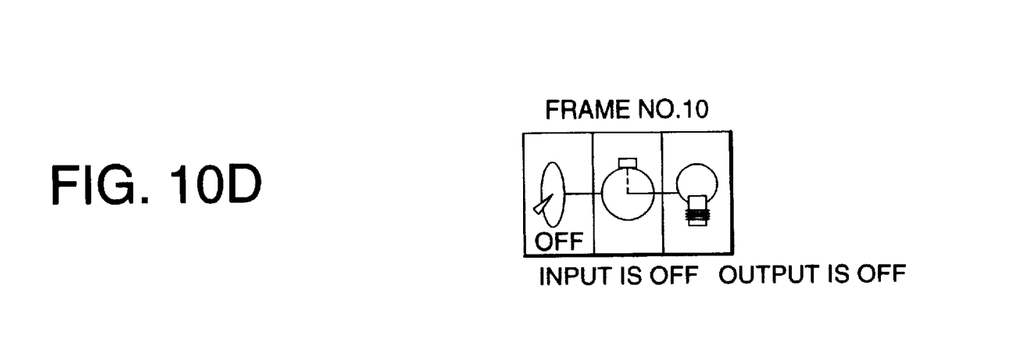

First, as shown in FIG. 10A, the initial states of the respective animations are displayed. Then, as shown in FIG. 10B, an appearance in which when "switch" is turned on, "lamp" turns on (lighting) is expressed while synchronizing the respective animations. Then, as shown in FIG. 10C, an appearance in which "lamp" remains on (lighting) even if "switch" is turned off is expressed while synchronizing the respective animations. Sequentially, if "switch" is off, the frame Nos. 2 to 9 are expressed as shown in FIG. 10C. Then, in FIG. 10D, an appearance in which "lamp" is turned off after a predetermined period of time elapses (is delayed) since "switch" is turned off is expressed.

(Third Embodiment)

Figure 11:
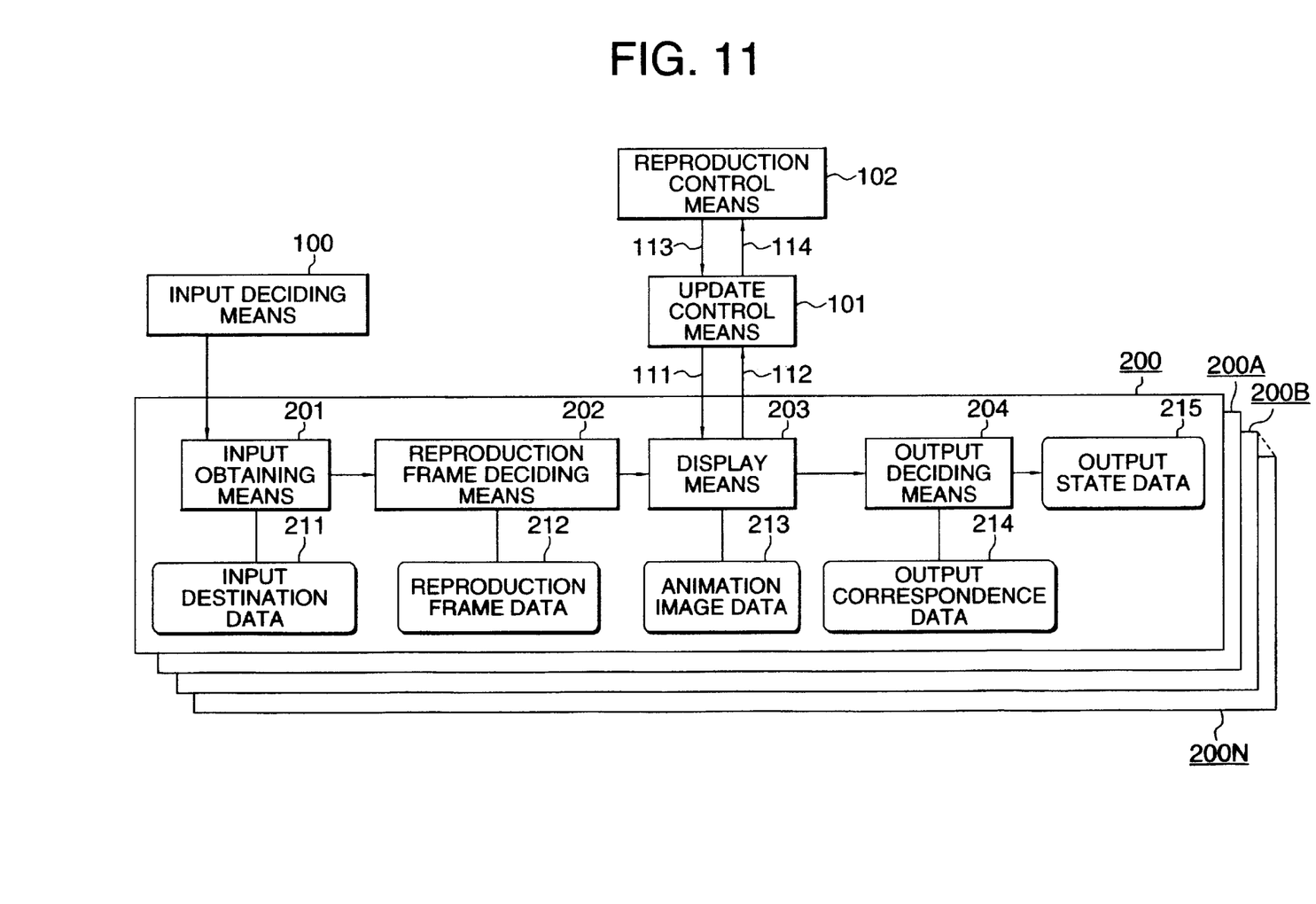
FIG. 11 is a block diagram showing the structure of a simulation display system in accordance with a third embodiment of the present invention.

A simulation display system in accordance with a third embodiment of the present invention will be described with reference to the drawings. FIG. 11 is a block diagram showing the structure of a simulation display system in accordance with the third embodiment of the present invention.

In the above-described first and second embodiments, the operation of one function block is displayed by animation, whereas in the third embodiment, the reproduction (start) and stop of animation display are controlled by the user's input.

In FIG. 11, the same functions as those in the first embodiment are denoted by identical reference numeral and their description will be omitted.

Reproduction control means 102 receives an input from a user and transmits a reproduction command 113 and a stop command 114 of the animation display to update control means 101.

Figure 12:
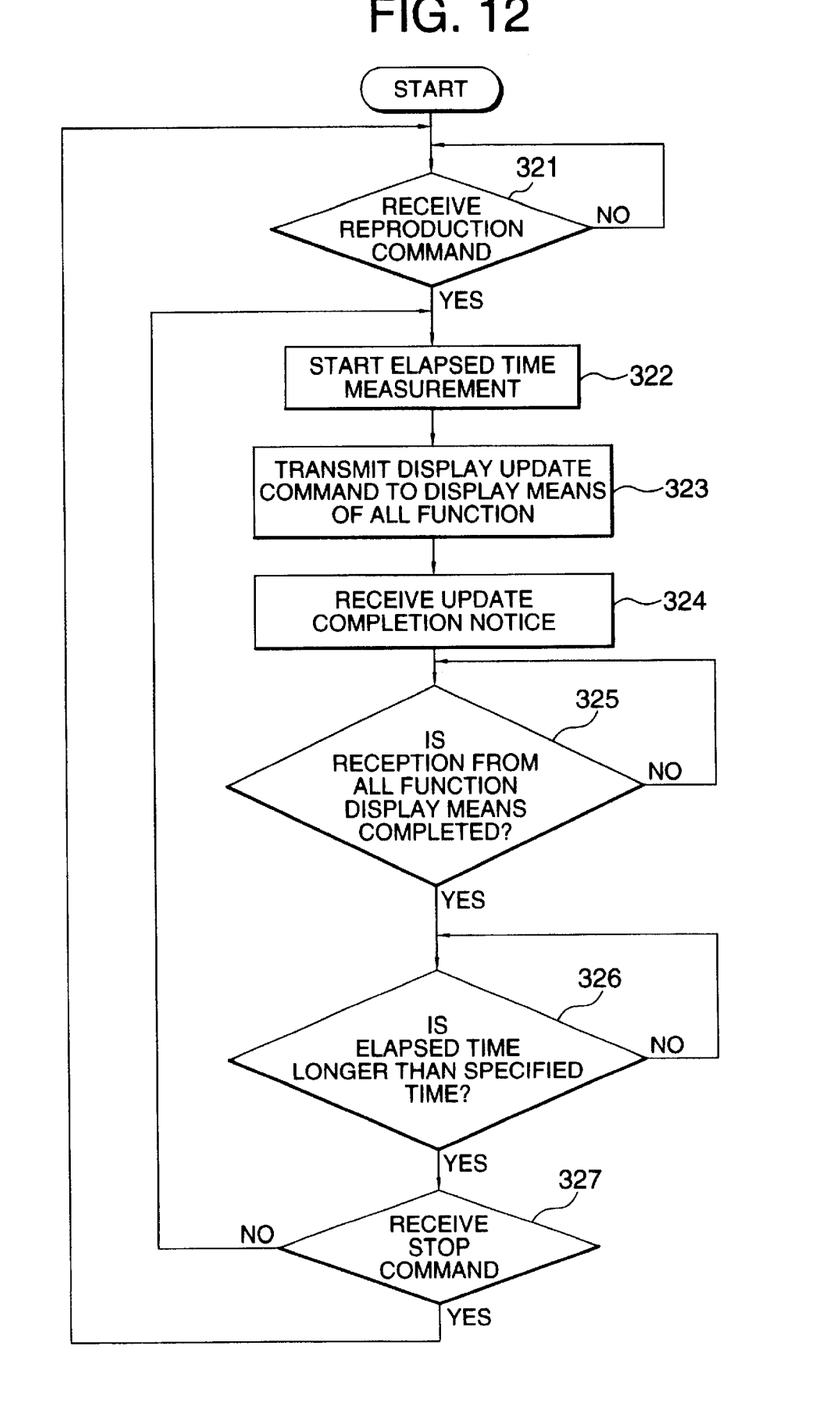
FIG. 12 is a flowchart showing the operation of the simulation display system in accordance with the third embodiment of the present invention.

Next, the operation of reproduction will be described with reference to a flowchart. Specifically FIG. 12 is a flowchart showing the operation of the update control means 101 at the time of reproduction.

First, in Step 321, waiting occurs until the update control means 101 receives the reproduction command 113 from the reproduction control means 102. Then, in Step 322, the measurement of an elapsed time starts. Thereafter, in Step 323, the display update command 111 is transmitted to all of the animation blocks 200, 200A, 200B, . . . 200N, and the respective animation blocks 200, 200A, 200B, . . . 200N update the animation display, respectively.

Subsequently, in Step 324, the update completion notices 112 from the display means 203 of the respective animation blocks 200, 200A, 200B, . . . 200N wait for synchronization. Then, in Step 325, it is judged whether the update completion notices have arrived from all of the animation blocks 200, 200A, 200B, . . . 200N, or not, and if not, waiting for the notice(s) continues.

Then, in Step 326, the elapsed time is compared with a specified time, and waiting occurs until the specified time elapses. Thereafter, in Step 327, if the stop command 114 is received, the reproduction command 113 waits again in Step 321, and if the stop command 114 is not received, the processing is branched to Step 322 again, and the animation display is updated while synchronizing.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A simulation display system for visually representing operation of a program without executing the program, said simulation system comprising:

input deciding means designating an input state;

update control means outputting a display update command to synchronize a plurality of animation displays;

a first animation block displaying a first animation representing operation of a first function block of a program to be subjected to simulation as a function of the input state designated by said input deciding means, and without executing the first function block, according to said display update command; and a second animation block displaying a second animation representing operation of a second function block of the program as a function of the input state designated by said input deciding means, and without executing the second function block, according to said display update command.

2. A Simulation display system as claimed in claim 1, further comprising:

reproduction control means sending a reproduction command for starting the reproduction of animation and a stop command for stopping the reproduction of animation, wherein said update control means sends the display update command to said first and second animation blocks upon receiving said reproduction command.

3. A simulation display system as claimed in claim 2, wherein each of said first and second animation blocks comprises:

input obtaining means obtaining the input state designated by said input deciding means as an input;

reproduction frame data describing a relation between an input state, current reproduction frame, and a succeeding reproduction frame;

reproduction frame deciding means selecting an animation display frame to be displayed next with reference to said reproduction frame data based on the input state obtained by said input obtaining means and a current animation display frame;

animation image data describing a relation between the next reproduction frame and animation image contents;

display means displaying a subject animation display with reference to said animation image data based on a next reproduction frame selected by said reproduction frame deciding means;

output correspondence data describing a relation between the current reproduction frame and an output state; and output deciding means selecting an output state with reference to said output correspondence data based on the current animation display frame.

4. A simulation display system as claimed in claim 3, wherein said input obtaining means of said second animation block obtains an output state selected by said output deciding means of said first animation block as an input state.

5. A simulation display system as claimed in claim 1, wherein each of said first and second animation blocks comprises:

reproduction frame deciding means selecting an animation display frame to be displayed next as a function of the designated input state and a current animation display frame.

6. A simulation display system as claimed in claim 5, wherein each of said first and second animation blocks further comprises:

output deciding means selecting an output state as a function of a current animation display frame.

7. A simulation display system as claimed in claim 1, wherein said input deciding means designates an input state based on an input signal or an input event.

8. A simulation display system as claimed in claim 1, wherein the designated input state is "on" or "off".

9. A simulation display method for visually representing operation of a program without executing the program, said simulation method comprising:

designating an input state;

outputting a display update command to synchronize a plurality of animation displays;

displaying a first animation representing operation of a first function block of a program to be subjected to simulation as a function of the designated input state, and without executing the first function block, according to the display update command; and displaying a second animation representing operation of a second function block of the program as a function of the designated input state, and without executing the second function block, according to the display update command.

10. A simulation display method as claimed in claim 9, further comprising:

sending a reproduction command for starting the reproduction of animation and a stop command for stopping the reproduction of animation, wherein said step of outputting a display update command sends the display update command for both the first and second animation displays when said step of sending sends a reproduction command.

11. A simulation display method as claimed in claim 10, wherein each of said displaying a first animation and said displaying a second animation comprises:

obtaining a designated input state;

accessing reproduction frame data that describes a relation between an input state, a current reproduction frame, and a succeeding reproduction frame;

selecting an animation display frame to be displayed next with reference to the reproduction frame data based on the obtained input state and a current animation display frame;

accessing animation image data that describes a relation between the next reproduction frame and animation image contents;

displaying a subject animation display with reference to the animation image data based on a selected next reproduction frame;

accessing output correspondence data that describes a relation between the current reproduction frame and an output state; and selecting an output state with reference to the output correspondence data based on the current animation display frame.

12. A simulation display method as claimed in claim 11, wherein a designated input state associated with displaying the second animation obtains an output state selected by said step of selecting an output state associated with displaying the first animation.

* * * * *